United States Patent [19]

Keeney

[11] 4,340,516
[45] Jul. 20, 1982

[54] COMPOUNDING MICA AND RESIN WITH HEAT SENSITIVE ADDITIVES

[75] Inventor: Allen J. Keeney, Saline, Mich.

[73] Assignee: Ford Motor Company, Dearborn, Mich.

[21] Appl. No.: 103,301

[22] Filed: Dec. 13, 1979

Related U.S. Application Data

[63] Continuation-in-part of Ser. No. 970,838, Dec. 18, 1978, abandoned.

[51] Int. Cl.$^3$ ............................................. C08L 91/06
[52] U.S. Cl. .................................... 523/216; 523/315; 523/344; 523/346; 524/449; 524/583
[58] Field of Search ........................ 260/42.14, 28.5 A

[56] References Cited

U.S. PATENT DOCUMENTS 2,663,695 12/1953 Perloff et al. .................... 260/42.14
3,453,356 7/1969 Kent et al. ........................... 264/143
4,001,174 1/1977 Yagi et al. ....................... 260/28.5 A

FOREIGN PATENT DOCUMENTS 865438 7/1978 Belgium .
2543634 12/1976 Fed. Rep. of Germany .

OTHER PUBLICATIONS

Titlow et al.; Reinforced Thermoplastics; 1975; pp. 125-136; Sci. Lib.; TP 1180.T5T52.

Primary Examiner—Lewis T. Jacobs
Attorney, Agent, or Firm—Peter D. McDermott; Roger L. May

[57] ABSTRACT

A method of rapidly compounding melt forming resin, mica and chlorinated hydrocarbon wherein the mica has a coating comprising the chlorinated hydrocarbon, which method comprises providing a molten mass of the resin, contacting the molten mass with the coated mica and kneading the so contacted mica and resin to provide mixing thereof. The compounding is rapid and at optimal temperature.

16 Claims, 1 Drawing Figure

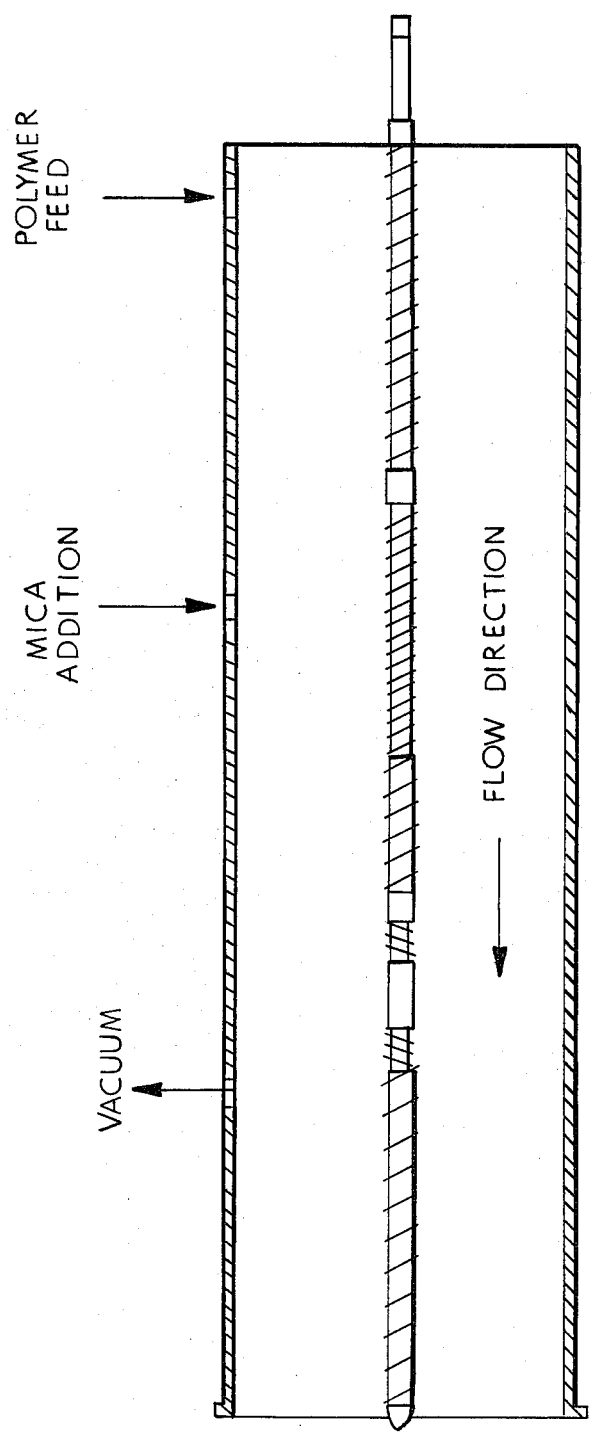

COMPOUNDING MICA AND RESIN WITH HEAT SENSITIVE ADDITIVES

RELATED APPLICATIONS

This application is a continuation-in-part of U.S. Ser. No. 970,838 filed Dec. 18, 1978 now abandoned. It is also related to U.S. Ser. No. 970,822 filed Dec. 18, 1978 in name of Meyer et al and now abandoned.

BACKGROUND OF THE INVENTION

This invention relates to compounding mica and certain melt forming resin with heat sensitive additives, such as chlorinated waxes, that act as coupling agents therefor and includes, in particular, a compounding operation that permits advantageous temperature control and rapid development of desirable physical properties.

U.S. Ser. No. 970,822 and 970,839, each filed Dec. 18, 1978 by Meyer and Newman disclose that certain chlorinated aliphatic compounds can act as coupling agents for mica and certain melt forming resins.

French Pat. No. 2,124,315 discloses a variety of techniques for compounding mica into an organic polymeric matrix and suggests dispersing the mica particles in thermoplastic resin prior to attainment of processing conditions.

A process has now been discovered that provides for compounding of mica and melt forming resin with heat sensitive additives such as chlorinated waxes at times less than a minute, if desired, whereby molding precursors are prepared that may be used in conventional molding operations to yield molded objects of highly desirable physical properties.

The precise conditions under which such compounding is accomplished are quite critical. Chlorinated aliphatic compounds such as heat sensitive chlorinated waxes herein are subject to reduction or even elimination of beneficial effects upon undesired decomposition with heat. Such decomposition is particularly acute during compounding with melt forming resin and mica particles since the mica particles act as heat sinks that are insulated by the resin during compounding and may, under conditions of high shear and mechanical heat generated thereby during intense mixing, cause compounding temperatures in excess of that which causes undesired decomposition, even though cooling is attempted.

On the other hand, low temperatures during such compounding, even if attainable, can lengthen the time required for coupling agents such as chlorinated waxes or other chlorinated aliphatic compounds to exhibit desired effect and consequently cause perhaps less efficient use of equipment or modification of existing equipment so as to extend periods at elevated temperature.

Even still further, however, very high shear can even cause deterioration of melt forming resin to an extent that the filled resins are undesirably brittle even though other properties may be satisfactory. Thus, for example, the high shear used to provide a molten resin in the process of this invention has to be controlled so as to keep the melt index (ASTM D1238) of the compounded resin preferably below about 15.

BRIEF DESCRIPTION OF THE DRAWING

The drawing is a schematic illustrating a portion of a twin screw extruder, a preferred apparatus for compounding in accordance with this invention.

One screw of the twin screw extruder is illustrated. The other screw (not shown) has flights corresponding to flights of the screw illustrated except that the flights are reversed in angle, i.e., the reverse flights are at the same but negative from normal as the flight angles of the screw shown. The screws are non-intermeshing and counter rotating. The screw not shown is of similar diameter, but shorter by about the length of three diameters thereby allowing attachment of the barrel to a conventional strand die orifice.

THE INVENTION

This invention relates to compounding mica and certain melt forming resins with heat sensitive additives, such as chlorinated waxes or other chlorinated aliphatic compounds that act as coupling agents therefor by, in general terms, making the resin molten (desirably with high shear), introducing mica particles previously blended with the particulate additives into the molten resin and kneading with reduced shear the mica particles and resin into a homogeneous melt.

In one preferred embodiment, the melt forming resin, e.g. polypropylene, is formed into at least two counter rotating, parallel molten streams that contact one another to form a turbulence therebetween, and coated mica particles are introduced into such turbulence allowing their rapid and effective dispersement throughout the molten resin with low shear kneading.

Compounding in this manner permits temperature control not otherwise easily attainable when mica particles and melt forming resin are admixed under conditions of high shear. Such high shear can impart to the melt of resin and mica particles sufficient mechanical work as to generate temperature increase that is not easily controllable. Kneading or low shear mixing, however, permits effective mixing of the mica and molten resin in short periods when done in accordance with this invention so that the mica particles are not at high temperature for extended periods under shear forces that cause such uncontrollable temperature increase and consequent undesired degradation of heat sensitive additives. Moreover, compounding in accordance with this invention does not expose the mica to shear forces that undesirably break such mica thereby exposing mica surfaces without heat sensitive coupling agents. Surprisingly, mica that is blended with particulate, heat sensitive additives may be compounded with melt forming resins such as polypropylene such that the total processing time at high temperature is as little as 15 seconds or less and yet provide molding precursors, e.g. pellets, which yield molded articles with desirable properties.

During compounding in accordance with this invention, it is particularly desirable that the melt forming resin receive high shear (prior to mica incorporation) that is sufficient to provide rapidly a molten mass of resin at desired temperatures but insufficient to cause significant change of the resin's properties. For example, it is preferred that a melt forming resin such as polypropylene having a melt index (ASTM D1238) below about 6 not undergo such shear prior to mica incorporation as to raise its melt index (ASTM D1238) above 15, even more preferably such that it is not above 12. Otherwise, final composites will have an undesired brittleness.

On the other hand, it is preferred to provide molten resin at a temperature (prior to incorporation of the mica and additive into the resin) at least about 10° F. below that temperature at which the additive first releases chlorine containing gas. To achieve maximum benefit of the additive in as short a time as possible, however, incorporation of mica and additive into the resin should be such that the resin has an initial temperature not more than about 60° F. (preferably, not more than about 50° F.) below that temperature at which the additive releases chlorine containing gas.

DETAILED DESCRIPTION OF THE INVENTION

The melt forming resins that may be advantageously compounded with mica and heat sensitive additives in accordance with this invention include commercially available materials that are designed for use in molding (such as by injection, compression, stamping etc.) processes. Of these commercial resins thermoplastics made from monomers comprising olefinic hydrocarbons such as ethylene, propylene, styrene, etc. are of special interest in that they can yield molded, mica containing articles with high strength and desirable resistance to heat distortion as well as economic advantage.

Melt forming resins made from monomers comprising olefinic aliphatic hydrocarbon monomers such as ethylene, propylene and the like can be compounded especially well and particularly desirable results are achieved with melt forming resins sold as polypropylene resins e.g. Gulf Polypropylene 6420 MHP, Hercules Profax 6523 Polypropylene. Normally such resins desirably have intrinsic viscosities above about 1.5 and preferably between about 2.0-2.6 for more expedient processing, although suitable modification will allow processing of resins with other viscosities. An important criterion, however, in selection of desirable melt forming resin is that it remain sufficiently molten at processing temperatures that do not degrade the efficiency of the heat sensitive additives. Moreover, the melt forming resin preferably has a melt index (ASTM D1238) below about 10, more preferably between about 2-6.

Other resins besides polypropylene resins include polyethylene as well as copolymers made from monomers comprising ethylene, propylene or other lower aliphatic hydrocarbon monomers such as copolymers of ethylene and propylene.

Mica fillers suitable for use in this invention are also commercially available. The mica can be generally characterized as being an aluminum silicate mineral that can be cleaved into thin sheets. Examples of commercially available mica filler include those normally denominated as muscovite, biotite and/or phlogopite micas. Mica filler comprising principally phlogopite mica as Suzorite mica marketed by Marietta Resources International constitutes a mica that allows formation of molded articles with particularly desirable properties, especially when compounded as herein.

The mica filler comprises thin flakes of mica that are typically made by delamination of mica mineral. Mica, such as that comprising principally phlogopite mica, that is retained on a 100 mesh screen, desirably on a 60 mesh screen is preferred and normally mica passing through a 20 mesh screen can be advantageously processed, although mica that is of other size will be suitable. Mica as that sold by Marrietta International as Suzorite 60-S and being referred to as unclassified with respect to aspect ratio can yield desirable composites. Measurement of number average aspect ratio (average diameter of flakes over average thickness) of such mica show them to have low aspect ratio, i.e., below 30, although higher aspect ratio mica may be employed, e.g. 20-200.

The heat sensitive additive for which this invention is particularly advantageous includes chlorinated compounds desirably comprising about 45-85% by weight chlorine, more preferably about 60-80% by weight and especially, chlorinated hydrocarbons such as waxes marketed as Chlorez (Dover Chemical), Chlorowax (Diamond Shamrock), and Kloro-chek (Keil Chemical, a division of Ferro Chemical). Typical molecular weights (weight average) for such chlorinated waxes are between about 500-2000, and especially between about 1000-1500 with desirable results especially being achieved with waxes having between about 70-78% by weight chlorine. Other chlorinated compounds that may be suitably employed include chlorinated aliphatics with as low as 5% by weight chlorine and molecular weights (weight average) as high as several thousand (e.g. 10,000).

Prior to compounding at least a portion of the additive is preferably dry contacted with the mica particles to provide a blend. For example, the mica and additive in powder or other suitable form can be tumbled together preferably at elevated temperature (to make the additive molten e.g. temperatures preferably between about 60°-180° C.) to yield a coated mica. (Other information on coating mica with chlorinated additives appears in U.S. Ser. No. 970,822 filed Dec. 18, 1978 and which is hereby incorporated by reference). Normally, the additive and mica will be admixed in this coating process such that the additive is added between about 0.1-15% (preferably about 1-5%) by weight of the combined mica and additive weight. The raw mica is desirably about 10-80% by weight of the combined weight of resin and mica.

In another method of making, mica is coated by contacting intimately the mica particles and additive in liquid carrier such as by dispersing powdered additive with mica and adding solvent thereto. Conventional solvents, e.g. aliphatic chlorides may be conveniently used. The latter procedure is described in commonly assigned U.S. Ser. No. 970,821, filed Dec. 18, 1978 (L. Bartosewicz) which is hereby incorporated by reference for such description.

The drawing illustrates a preferred manner in which compounding is accomplished in accordance with this invention. The device illustrated is one side of a twin screw extruder which is, in preferred mode, operated such that the screws are counter rotating and non-intermeshing. Such twin screw extruders are commercially available with variable screw configurations from Welding Engineer, Inc.

Melt forming resin such as polypropylene is added to one end of the twin screw extruder in an area of flight configuration preferably that subjects it to sufficiently high shear to cause elevated temperature, e.g. 440° F. and to provide a molten mass of resin prior to addition of the mica and additive blend. (By "molten" herein is meant with reference to resin that particles of resin are at a temperature that can (or does) provide their coalescence with one another.) Initially, the barrel of the extruder at this area may be heated to maintain its temperature in a range above about 400° F., preferably about 420°-460° F. During extended use, however, this area is maintained by conventional means at desired processing temperature, e.g. 435°-455° F.

The coated mica is thereafter introduced into the molten resin through one or more ports downstream as illustrated in the drawing. Essential to the addition of blended mica and additive particulate is its reduced shear mixing with the molten melt forming resin so as to maintain temperature control. It is found that high shear mixing as in many conventional extruders causes such work on the mica particles as to cause an uncontrollable temperature rise when compounded at very high speeds e.g. 600 lb./hr. or higher. This temperature rise markedly reduces the efficiency of the heat sensitive additives and in one case, e.g. Chlorez (Dover Chemical) with about 74% by weight chlorine causes significant deterioration, at temperatures above about 480° F.

In order to obtain maximum effect of the additive in as rapid as possible time, the temperature of the resin prior to mica incorporation is carefully controlled. Additionally, the shear applied to the resin is controlled so as to insure that the melt index (ASTM D1238) is preferably maintained below 15 and preferably below 12 or even 10 for most product applications. Thus, the amount of shear that is applied to the resin (prior to mica incorporation) is that amount which does not significantly elevate its melt index but which does provide a temperature high enough for rapid and effective incorporation of mica and additive. Such temperature or "initial mixing temperature" is preferably in a range that is not lower than about 60° F. below a temperature which would cause evolution of chlorine containing gas from the additive by thermogravametric analysis. More preferably, such initial mixing temperature is not lower than about 25° F. below that temperature. (Well known thermogravimetric analysis techniques for determination of a temperature of first evolution of chlorine containing gas (i.e. outgassing of the additive) may be used. For example, Chlorez 700 from Dover Chemical and having about 74% by weight chlorine in the wax outgasses at about 480° F.).

The resin, however, prior to mica and additive incorporation may be at a temperature above the temperature at which there would be outgassing from the additive. This is because incorporation of mica into the resin first provides some cooling to the resin. Thus, for example, at especially high loadings of mica, e.g. 50%-75% or more, even higher initial temperatures for the resin may be tolerated or even advantageous. For most circumstances, however, the initial temperature of the resin is desirably between about 10°-60° F. below that temperature at which there would be outgassing of the additive.

The temperature at which mica and resin mix should preferably not be allowed to reach a temperature about 25° F., more preferably 15° F. higher than the initial mixing temperature of the resin. Additionally, such temperature should be in a range below that temperature at which chlorine containing gas evolves from the additive. Such a temperature range is accomplished by low shear kneading of the mica particles into the resin. Cooling of the extruder during mica incorporation into the resin may be used.

As previously noted, it is particularly desirable that the melt index of the resin not exceed about 15 (ASTM D1238). In other product applications, however, a higher melt index may be useful. In such a circumstance, very high shear or, in some circumstances, chemical additives (e.g. peroxides) may be used to provide products (e.g. pellets) at a melt index of 20 or higher.

As mentioned, it is preferred to use twin screws that are counter-rotating, and desirably the twin screws are non-intermeshing as are available commercially. By adding the mica into a turbulence created between counter rotating streams of molten resin created by such devices good initial mixing, is obtained.

Various flight changes as illustrated in the drawing during passage of the resin as well as resin and mica through the above described twin screw extruder can also be of advantage to promote mixing as will be understood by those in the art. As there are matters within the skill of the art, no further description is believed necessary. As previously mentioned, however, the amount of shear applied is such that its melt index (ASTM D1238) is not elevated above about 15, more preferably 12.

As shown in the drawing, it is advantageous to draw a vacuum from the extruder, preferably, as shown, downstream from mica addition. Such vacuum may be desirably, for example, in the range of about 15 inches of Hg, more preferably about 20 inches Hg as 22 inch Hg. Such vacuum removes entrapped gases as air or volatiles developed during compounding.

The extruder may be fitted at the end, for example, with a conventional strand die (not shown) to yield strands that are cooled and diced into composite molding precursors, e.g. pellets. Moreover, the extruder may also be connected to shaping devices that take strands or other molding precursors and shape them into desired object. Furthermore, if desired, the extruder may be fitted with extensions as heated pipes that provide additional time for interaction of the mica and melt forming resin.

Advantageously, however, as mentioned, the entire compound extrusion provides a melt residence, i.e. time that mica and melt forming resin and additive exist in melt form of less than about 30 seconds, more usually less than about 15 seconds. Although additional melt residence is provided by further molding activities, e.g. injection molding, pellets compounded in the manner described can provide molded articles of excellent properties under standard shaping conditions.

The mica in this invention may be replaced in part, as is understood, by other particulates, e.g. talc, glass, calcium carbonate and the like to provide desired modifications, such particulates being added with, for example, the mica or at other convenient processing times.

The following examples are intended to illustrate the invention in currently preferred aspects and should not therefor be interpreted as necessarily limiting the scope thereof for those in the art will recognize other readily apparent modifications within the hereinbefore disclosed invention. As used in these examples as well as used in the hereinbefore description and hereinafter appended claims, melt index is grams per 10 minutes.

EXAMPLE 1

Using a Welding Engineers 2.0" Twin-Screw Extruder, equal parts by weight of Gulf Polypropylene 6420 MHP and coated mica are compounded. The mica is combined with Chlorez 700 by tumbling it with heated mica to yield a coating thereon. The Chlorez 700 is used at a level that would be about 1% by weight of the combined weight of mica and polypropylene. Chlorez 700 (available from Dover Chemical) has about 74% chlorine by weight, an average molecular weight of about 1250 and a nominal formula indicating one extra chlorine for the number of carbon atoms present. The raw mica is Suzorite 60-S marketed by Marietta International.

The temperature of the extruder is maintained at 440° F. and the polypropylene continuously starve fed followed by continuous starve feeding of the so combined mica and additive particles. The polypropylene has a temperature of about 440° F. and MHP index below 10 before combined mica and additive particle addition. The twin screws are counterrotating and non-intermeshing and a vacuum of approx. 22 inches is maintained. The resin becomes molten after passage of about 8" along the extruder. The rate of addition yields 600 lb./hr. of compounded product which is sent through a strand die to provide strands about ¼" or less which are thereafter cooled and diced into pellets. The strands exit the extruder at a temperature of about 450° F. The pellets are molded into standard test bars by injecting at 600 psi and 428° F. The properties of the test bars are as follows:

| Properties | ASTM Method | 50% Mica/PP |
|---|---|---|
| Tensile Strength, PSI | D638-72 | 4,830 |
| Tensile Elongation % | D638-72 | 1.02 |
| Flexural Strength, PSI | D790-71 | 7,790 |
| Flexural Modulus, PSI | D790-71 | 1,275,000 |
| Deflection Temperature | D648-72 | |
| 264 PSI °F. | | 268 |
| 66 PSI °F. | | 303 |
| Izod Impact, Ft./lbs./in. | B256-73 | |
| Notched | | .59 |
| Unnotched | | 2.00 |
| Specific Gravity | D792-70 | 1.375 |
| Mold Shrinkage | D955 (F) | .0016 |
| | (T) | .0018 |

The elapsed time between introducing a portion of the resin and its exiting in the strands from the extruder is within 15 seconds.

EXAMPLE 2

The procedures of Example 1 are followed except for replacement of a section of the screws that melt the resin prior to incorporation of the mica. This section provides very high shear to the resin and imparts to the resin a melt index of above 20. The filled resin has similar properties to those listed in Example 1 but exhibits brittleness.

EXAMPLE 3

The procedures of Example 1 are followed except that the mica is coated with a solution of Chlorez 700 in methylene chloride. Essentially comparable results are obtained.

EXAMPLE 4

The procedures of Example 1 are followed except that the temperature of the extruder is maintained at about 450° F. and the strands exit at about 460° F. Similar results are obtained.

EXAMPLE 5

The pellets of Example 1 are molded by injection molding at 440° F. at 1100 psi into a mold maintained at 120° F. to yield a crash pad retainer suitable for automotive application. The retainer is flame treated prior to its contact with a polyurethane precursor and the precursor foamed between the retainer and vinyl sheet to provide a mica and polypropylene/foam/vinyl laminate.

EXAMPLE 6

The procedures of Example 1 are followed except that the chlorinated wax comprises Chlorowax 70, marketed by Diamond Shamrock. Similar results are obtained.

EXAMPLE 7

The procedures of Example 1 are followed except that the mica is introduced in equal parts by weight into two different ports, the second being downstream from the first. Essentially similar results are obtained.

EXAMPLE 8

The procedures of Example 1 are followed except that the weight proportions of resin and coated mica particles are 3:2 respectively. Molded test bars show excellent properties.

EXAMPLE 9

The procedures of Example 1 are followed except that the melt forming resin contains calcium carbonate.

EXAMPLE 10

The procedures of Example 1 are followed except that the coated mica is added to yield pellets that comprise 5% by weight mica.

EXAMPLE 11

The procedures of Example 1 are followed except that the weight ratio of coated mica to melt forming resin is 2:1.

What is claimed is:

1. A method of compounding in less than about 30 seconds at elevated temperatures mica and melt forming resin made from monomers comprising olefinic hydrocarbon monomers wherein the mica has a coating comprising a chlorinated hydrocarbon having about 65–80% by weight chlorine, which comprises:
   (A) providing the resin, rendered molten by a first shear and having a melt index (ASTM D1238) below about 15, at a temperature in the range about 10°–60° F. below that temperature at which chlorine containing gas evolves from the chlorinated hydrocarbon coating, the resin being provided in first and second streams that are counter rotating with respect to one another and provide a turbulence therebetween;
   (B) introducing the coated mica into the turbulence; and
   (C) kneading the coated mica into the streams under a second shear, lower than the first shear, at a temperature below that temperature at which chlorine containing gas evolves from the chlorinated hydrocarbon.

2. The method in accordance with claim 1, wherein the melt forming resin comprises polypropylene and the additive comprises chlorinated wax having about 65–75% by weight chlorine.

3. The method in accordance with claim 2, wherein the mica comprises phlogopite mica.

4. The method in accordance with claims 1 or 2 or 3 wherein the upper temperature during compounding is below about 480°.

5. The method in accordance with claims 1 or 2 or 3, wherein the molten mass of resin comprises at least two counter rotating streams of the resin that contact one another.

6. The method in accordance with claim 1, wherein the resin comprises polypropylene and the additive comprises chlorinated wax.

7. A continuous method for compounding at elevated temperature in less than about 30 seconds mica and melt forming resin made from monomers comprising olefinic aliphatic hydrocarbon monomers wherein the mica has a coating made by contacting the mica particles with a heat sensitive additive comprising a chlorinated hydrocarbon comprising about 65–80% by weight chlorine, which method comprises:

(A) providing at least two streams of molten resin having a melt index (ASTM D1238) below about 15 that are counter rotating with respect to one another and contact one another to provide a turbulence therebetween, the molten resin being at an initial mixing temperature in a range which is not lower than about 60° F. below that temperature at which chlorine containing gas would evolve from the additive;

(B) introducing into the turbulence the coated mica; and (C) kneading the resin and mica to provide a mixing thereof at a temperature which below that temperature at which chlorine gas would evolve from the additive.

8. A method of compounding in less than about 15 seconds at elevated temperature mica and polypropylene resin wherein the mica has a coating comprising chlorinated aliphatic hydrocarbon comprising about 65–80% by weight chlorine, which method comprises:

(A) providing the resin, rendered molten by a first shear and having a melt index below about 12, at a temperature in the range about 10°–60°F. below that temperature at which chlorine containing gas evolves from the chlorinated hydrocarbon coating;

(B) contacting the molten mass with the coated mica;

(C) kneading the molten mass and the coated mica under a second shear, lower than the first shear, at a temperature below that temperature at which chlorine containing gas evolves from the chlorinated hydrocarbon.

9. A method in accordance with claim 8, wherein the molten mass in step (A) is at a temperature between about 435°–455° F.

10. A method in accordance with claim 9, wherein the temperature of (C) is below about 480° F.

11. A method in accordance with claims 8 or 9 or 10, wherein the melt index (ASTM 1238) of the molten mass in (A) is below about 10.

12. A method in accordance with claim 17, wherein the polypropylene resin has a melt index between about 2 and 6.

13. A method in accordance with claim 12, wherein the mica comprises phlogopite mica.

14. A method in accordance with claims 8 or 9, wherein the chlorinated hydrocarbon is a chlorinated wax.

15. A method in accordance with claim 14, wherein the chlorinated wax has between about 70–78% by weight chlorine.

16. A method in accordance with claim 15, wherein the polypropylene resin has a melt index between about 2 and 6.

* * * * *